UNITED STATES PATENT OFFICE.

HENRY Y. D. SCOTT, OF EALING, ENGLAND.

IMPROVEMENT IN THE MANUFACTURE OF FERTILIZERS FROM SEWAGE.

Specification forming part of Letters Patent No. 154,092, dated August 11, 1874; application filed May 12, 1874.

*To all whom it may concern:*

Be it known that I, HENRY YOUNG DARRACOTT SCOTT, of Ealing, in the county of Middlesex, England, major-general, C. B., have invented certain Improvements in the Deodorization of Excreta, and in the manufacture of manures therefrom, of which the following is a specification:

The object of this invention is the prevention of nuisance in dealing with night-soil and urinous liquids, and the fixation of their fertilizing elements, so as to render them valuable marketable commodities.

In carrying out my invention with night-soil I separate the solids from the liquids, and I use such substances as charcoal, dried earth, dried or scorched sewage deposit, sawdust, town-ashes, road-scrapings, and other substances of the same class, for deodorizing the solids, and I extract the phosphoric acid and nitrogen present in the liquids by means of compounds such as lime and hydrated phosphate of magnesia, or compounds which would produce such salt by their mutual reaction, in the manner hereinafter set forth.

For the charcoal I prefer to use charcoal made out of sewage deposit, and for lime I prefer to use that which is prepared from pure limestone; but it may be sometimes convenient to employ other descriptions of charcoal and lime, and I sometimes also substitute magnesia or dolomitic lime for lime.

I am aware that charcoal and the other substances mentioned have already been used for deodorizing night-soil, and that alkaline earths have been employed for the treatment of such matters and the decomposition of nitrogenous substances, as well as for precipitating liquid sewage; that salts of magnesia and soluble phosphates have also been tried as chemicals for precipitating the suspended matters and ammonia from raw sewage; and that hydrated phosphate of magnesia has been before proposed as a means for recovering ammonia from urinous and ammoniacal liquids. I therefore make no claim for the use of any of these substances simply as such; nor do I claim for the use of lime in conjunction with charcoal as purifying and deodorizing agents, unless employed substantially in the manner or manners specified.

My present invention consists essentially of novel combinations in the use of the above-mentioned substances, and of novel modes of applying them to the treatment of night-soil and urinous liquids which are received into cess-pools and other like receptacles, or after removal therefrom.

In carrying out the process in cess-pools and other receptacles of night-soil, the charcoal or other equivalent deodorant may be applied occasionally through the fronts of the seats or otherwise, or it may be applied by well-known mechanical arrangements which discharge a certain amount of the deodorant after each use of the privy or closet; but such use of deodorants may be dispensed with and the liquids be separated from the solids by merely straining through a screen. The liquids which drain off from the deodorants or the solid fæces are caused to traverse filtering mediums consisting of layers of lime and of hydrated phosphate of magnesia, and where great purity is required the liquids to be cleansed are also passed through filters of charcoal. The lime in such filters will retain the phosphoric acid present in the soluble form, and will also decompose the urea of the urine, and at the same time produce ammonia, which is then fixed by passing the urine through filters of hydrated phosphate of magnesia in the form of ammoniacal phosphates. Any phosphoric acid remaining in solution in the liquid (which passes through the filter of phosphate of magnesia) is to be fixed by a second filter of lime. In cases in which the flow of urinous or ammoniacal liquid is rapid, (as, for instance, in cases in which the urine from several blocks of houses is led to one point for treatment, and in public urinals,) I employ a series of such filters of lime and hydrated phosphate of magnesia.

One mode of applying my invention to single cess-pools or middens is as follows: I form in or adjoining the cess-pool a chamber, into and through which the liquids can flow off into the drains after passing through filters of the before-mentioned substances, while the solid fæces remain behind. The bottom of this chamber is provided with a catch-pit to allow of the settlement of any of the precipitated fertilizing matters which escape retention by the filters. The direction of the filtration may be either upward or downward, or may pass through the filters horizontally placed in series, and so arranged that the overflow of supernatant liquid from one filter may pass into the next, and so on.

Supposing upward filtration to be the plan to be followed, I commence by placing at the bottom of the chamber, or at some distance from it, as may be most convenient, a layer of charcoal, $a$. Over or adjoining this I place a layer of lime, $b$. Over or adjoining the lime filter a layer of hydrated phosphate of magnesia, $c$, and over or adjoining the phosphate of magnesia a layer of lime, $d$. Over or adjoining the layer $d$ another layer of charcoal, $e$.

If the filters are arranged horizontally in series, the clear supernatant liquid from one tank or filter-vessel flows through a channel to the bottom of the next; but if they are arranged vertically, one over the other, I prefer to separate the different layers by cocoa-nut matting, horse-hair cloth, or other suitable material, confined at the edges in frames of galvanized iron. The galvanized-iron frames should fit the chamber pretty accurately, and can be supported on "sets-off" provided in its construction. It is not, however, absolutely necessary to separate the layers of filtering substance in this manner, although it will be found convenient to do so when the phosphate of magnesia is to be recovered, in order that it may be used to deal with a fresh quantity of urine. The urinous liquids, after passing through such a system of filters, will flow into the drains in a comparatively pure and innoxious condition. The quantities of the chemicals used will depend on the number of persons using the cess-pools, the frequency with which they are emptied, and the occupation of the people.

If the people are employed out of doors, manifestly less urine will find its way into the cess-pools, as, during the day, it will be chiefly voided in the fields. The proportion of phosphates and urea in the urine is also much influenced by the character of the food of a population. It will be necessary, therefore, that the time which should be allowed to elapse before the renewal of the lime and phosphate of magnesia and the charcoal should be a matter for observation in each case. In an average case, a cess-pool for ten persons would require, per month, from five to ten pounds of lime, if the urine is stale, and from fifteen to twenty pounds if the urine is fresh, and from seventy-five to one hundred pounds, per month, of hydrated phosphate of magnesia; but the quantity of lime required to effect the purpose of my invention will manifestly depend on the chemical composition of the lime used, as well as on the richness, or otherwise, of the excreta to be dealt with. The charcoal or other deodorant of the solid fæces is also manifestly dependent on the character of the substance, and must be determined by actual trial in each case.

When the cess-pool is emptied, the different layers may be kept distinct, or, if the free lime or magnesia which may happen to remain is first neutralized, the layers may all be mixed together. The action of free alkaline earths tends, as is well known, to the expulsion of ammonia from its combinations. In large towns it is more economical to deal with the layer of ammoniacal phosphate of magnesia separately, and (by well-known methods) to expel the ammonia and re-employ the recovered phosphate of magnesia for dealing with a fresh portion of ammoniacal liquid. In cases in which the cess-pools are very large, the liquids drain from them slowly, and they are only emptied at long intervals.

The omission of the filter of lime $d$ is of less importance, as much of the urine will have passed into decomposition spontaneously before it reaches the layer of phosphate of magnesia, and, in some cases, I provide a chamber of sufficient capacity to enable the urine to decompose before it reaches the filter of phosphate of magnesia, and then dispense altogether with the lime filter $d$. The filter of lime $b$ will extract the phosphoric acid of the soluble phosphates which pass through, as well as those which are dissolved out from the layer of phosphate of magnesia $c$.

It is of considerable advantage to make the lime filters in two or more divisions, and in the first of these divisions (or that through which the urine first passes) to employ lime which has been already partly exhausted in the second and third divisions, and to replace what is removed from the latter with fresh lime. The whole of the lime may be finally fully exhausted in the first division of filter $d$. By this means the lime in the first division of filter $d$ can be brought to a degree of richness in phosphoric acid and nitrogen compounds which will render it a highly valuable commodity, and promote the decomposition of the urine which passes through it.

In many cases in which the more perfect arrangements above described are considered as inapplicable in consequence of the trifling amount of urine to be dealt with, the filter of phosphate of magnesia may be dispensed with, as well as the charcoal filters. The contents of the second lime filter are brought forward to the first as soon as they have become about two-thirds exhausted, and the second filter is refilled with fresh lime. The second filter, in this case, breaks up the nitrogenous compounds, and allows the effluent to become charged with lime, which preserves it in an innoxious condition, and the carbonate of lime left in the filter is again decomposed, when removed to the first filter, by the phosphoric acid in the urine.

Although I consider the plan above described is best for dealing with single cess-pools, it is not essential that a distinct chamber should be made for the filters, nor that the materials should be applied as filters, for stirring in excessive quantities of the chemicals, as compared with the amounts of the compounds to be removed from solution, would manifestly produce analogous results. In either case the liquid would leave the last lime filter saturated with free lime, which will produce valuable effects in cleansing the sewer into which it ultimately finds its way. The process of stirring is, however, only applicable when dealing with urine at a depot.

It will be sufficient, in dealing with single cess-pools, to spread the different layers of filtering material one over the other on the bottom of the cess-pool, and to protect each layer by cocoa-nut matting or canvas, if it be considered desirable to keep the chemicals separate. On the upper layer is placed a perforated metallic or other screen, to protect it from the shovels of workmen when removing the solid fæces. In cases in which the liquids cannot pass off into the sewers, a supplementary cess-pool may be attached to the chamber, into which the liquids can be drained after passing through the said filtering mediums. From this cess-pool the liquids (which, after passing through the filtering mediums, will be comparatively pure) can be pumped at intervals into the nearest sewer or water-course.

When the system is followed of collecting the night-soil and conveying it to a depot, to be there converted into a portable manure, some modifications may be introduced into the mode of procedure. In cases in which the night-soil is carried to the depot without any special treatment with absorbents, I prefer that receptacles should be used which separate the solids from the liquids, and that the solids and liquids should be collected separately. I then deodorize the solids by mixing them with dried sewage deposit, charcoal, or other equivalent substance, and this process also brings them into a more favorable condition for drying.

In the treatment of the liquid I sometimes add to it a sufficient quantity of milk of lime, to precipitate the soluble phosphates before proceeding to the subsequent filtration processes. The precipitate thus obtained will contain some nitrogenous matter, and will be a valuable manure.

The remainder of the process, instead of being like that before described, wherein filtration solely was employed, may be conducted in tanks provided with stirring machinery, and the means of running off the supernatant liquid into the tank next in the series, after the chemicals (the lime and the hydrated phosphate of magnesia) have been well stirred with the liquid and then been allowed to settle. I also prefer to employ several tanks for each class of operation, with the view of securing the more complete action of the chemicals, for by this means the most saturated portions can be subjected to the strongest solutions.

With the object of producing an additional quantity of precipitated phosphate of lime, very suitable for agricultural purposes, I sometimes treat the urine, either before the first or the second lime treatment, (i. e., that which follows the hydrated phosphate of magnesia process,) with a solution of a phosphate prepared from impure phosphatic materials.

In certain cases, also, in lieu of using hydrated phosphate of magnesia, or in conjunction with it, I add phosphoric acid or a phosphate salt to the urine, and filter it through magnesia in a fine state of division, (slaked or unslaked,) or through calcined dolomite. Similarly, by the use of soluble phosphates and phosphoric acid, in combination with soluble salts of magnesia, some portion of the ammonia will be precipitated in the tank in which the operation is conducted, and in the subsequent lime-filtration processes notable quantities will be arrested by the action of the filters, and when the whole of the lime is converted into phosphate by the urine, no important loss of ammonia will subsequently occur. If the lime is not all so converted, it should be neutralized with hydrochloric or sulphuric acid.

The liquid will pass off finally saturated with lime, and will assist in cleansing the sewers which it flows through.

If filtering fabrics are used to support the phosphate of magnesia, there is a tendency to the formation of crystals of ammoniacal magnesian phosphate in their pores, and thus the proper filtration of the liquids is impeded. It is of advantage, therefore, to wash these fabrics at intervals with an acid solution.

By a special arrangement of privy-drains, the drainage from several houses may be conducted to one point before discharge into the main sewers, and a filtering apparatus composed of two or more separate sets of filters of the before-mentioned substances may be there placed, and be so arranged as to be readily visited for the purpose of stirring or rearranging the filters as they become saturated, or for removing the chemicals after they have done their duty. In this case, and also in the case of public urinals, it is easy to arrange for periodical flushings without interfering with the filters. To accomplish this it is merely necessary to provide means for shutting the channel through the filters and opening another subsidiary channel to carry off the water or to make the filters themselves easily removable. Similar arrangements can be made for cases in which closets are used which are flushed at intervals. With a view, also, of keeping the urinals sweet, I pass a small quantity of milk of lime down the pipe for the urine at intervals, as may be required.

In all these cases the charcoal may be mixed with the lime and phosphate of magnesia without departing from the nature of my invention; but I prefer to follow the plan above described, which gives compounds having a higher value than when the charcoal is mixed with the lime or other chemical agents.

Lime and phosphate of magnesia may be mixed together and used in one filter, but no advantage will be obtained over the plan I have already described.

Having now described my invention of improvements in the deodorization of excreta, and in the manufacture of manures therefrom, and having explained the means whereby the same may be carried into effect, I wish it to be understood that I claim as new—

1. The process of deodorizing excreta, night-soil, and urinous liquids, and the extraction or fixation of their fertilizing elements, by first separating the solids from the liquids and deodorizing the solids by the use of charcoal, dried earth, dried or scorched sewage deposit, sawdust, town-ashes, road-scrapings, and substances of the same class, as herein set forth, and then extracting the phosphoric acid and nitrogen from the liquids by the use of lime, hydrated phosphate of magnesia, or compounds which, by reaction, produce such salt as herein set forth, for deodorizing the contents of cess-pools or other analogous receptacles.

2. The process of operating on the solids separately, whether the selected deodorant be applied by hand or by well-known mechanical arrangements, or the solids be separated by a screen, and then filtering the liquids through layers of lime and hydrated phosphate of magnesia, and, when required, through charcoal also, as herein described.

3. The process of subjecting the excreta to these combined operations, whether the direction of filtration be upward, downward, or horizontally, so long as such filtration be through a series of filters composed of layers of charcoal, lime, hydrated phosphate of magnesia, lime, and charcoal, each layer being protected by cocoa-nut matting or canvas confined at the edges in frames of galvanized iron, the upper layer being also protected by a perforated metallic screen, as herein set forth.

London, December 31, 1873.

HENRY Y. D. SCOTT.

Witnesses:
H. K. WHITE,
A. S. BISHOP,
   66 *Chancery Lane, London.*